United States Patent
Nishi et al.

(10) Patent No.: US 7,681,713 B2
(45) Date of Patent: Mar. 23, 2010

(54) ARTICLE CONVEYING DEVICE

(75) Inventors: Tokuo Nishi, Ishikawa-Ken (JP); Koji Kaya, Ishikawa-Ken (JP); Tatsuhiro Nakada, Ishikawa-Ken (JP); Hideki Nishikawa, Ishikawa-Ken (JP); Takashi Shimomura, Ishikawa-Ken (JP)

(73) Assignee: Shibuya Kogyo Co., Ltd., Kanazawa-shi (JP)

( * ) Notice: Subject to any disclaimer, the term of this patent is extended or adjusted under 35 U.S.C. 154(b) by 255 days.

(21) Appl. No.: 12/070,506

(22) Filed: Feb. 19, 2008

(65) Prior Publication Data
US 2008/0223691 A1 Sep. 18, 2008

(30) Foreign Application Priority Data
Mar. 15, 2007 (JP) ............................. 2007-067303

(51) Int. Cl.
*B65G 47/86* (2006.01)
(52) U.S. Cl. ............. 198/470.1; 198/469.1; 198/474.1; 198/478.1
(58) Field of Classification Search ............ 198/377.01, 198/377.03, 377.07, 377.06, 377.1, 441, 198/450, 459.2, 470.1, 474.1, 476.1, 608, 198/867.01, 867.02, 867.05, 803.3, 803.7, 198/475.1, 478.1, 370.01, 370.1, 369.5
See application file for complete search history.

(56) References Cited
U.S. PATENT DOCUMENTS 2,275,978 A * 3/1942 Mingle .................. 198/377.06
3,590,982 A * 7/1971 Banyas .................... 198/470.1
3,718,216 A * 2/1973 Wilson .................. 414/223.01
5,232,717 A * 8/1993 Voss ........................... 425/534
5,863,571 A * 1/1999 Santais et al. ............... 425/526
6,779,651 B1 * 8/2004 Linglet et al. ............. 198/803.9
7,451,868 B2 * 11/2008 Legallais et al. ......... 198/470.1

FOREIGN PATENT DOCUMENTS

JP 11-502175 2/1999
JP 2003-502238 A 1/2003

* cited by examiner

*Primary Examiner*—Gene Crawford
*Assistant Examiner*—William R Harp
(74) *Attorney, Agent, or Firm*—Flynn, Thiel, Boutell & Tanis, P.C.

(57) ABSTRACT

An upstream side wheel includes grippers B which do not perform opening and closing operations for themselves, and a downstream side wheel includes grippers A each having an opening and closing mechanism, and in a delivery position in which both the wheels are adjacent to each other, a plastic bottle 1 is delivered from the gripper B to the gripper A. Here, if the upstream side wheel or the downstream side wheel abnormally stops, the grippers A are switched from a use state to a retreat state. Thereby, interference between plastic bottles gripped by the upstream side grippers and the grippers of the downstream side wheel is avoided. Even if one of the wheels abnormally stops, the other wheel can be continuously operated without increasing the equipment in size.

6 Claims, 7 Drawing Sheets

3: BLOW MOLDING LINE
4: FILLING LINE

ARTICLE CONVEYING DEVICE

FIELD OF THE INVENTION

The present invention relates to an article conveying device, and particularly relates to an article conveying device which delivers articles to grippers of a rotary wheel at a downstream side from grippers of a rotary wheel at an upstream side in a delivery position in which the rotary wheels are adjacent to each other.

DESCRIPTION OF THE PRIOR ART

Conventionally, in a beverage manufacturing line which carries out molding of, for example, plastic bottles as articles to filling of beverage, a molding device for molding the plastic bottles and a filling device for filling beverage or the like into the plastic bottles are included, and the molding device and filling device are provided with an article conveying device for conveying the plastic bottles (Patent Documents 1 and 2).

Of them, as the article conveying device of Patent Document 1, a conveying device 3 for conveying plastic bottles is provided between the molding device and the filling device, and as the article conveying device of Patent Document 2, a star-shaped conveying wheel 6 and a star-shaped conveying wheel 7 which are adjacent to each other are provided in the boundary of the molding device and the filling device.

The star-shaped conveying wheels 6 and 7 of Patent Document 2 respectively include a plurality of grippers, so that plastic bottles are delivered to the grippers of the star-shaped conveying wheel 7 from the grippers of the star-shaped conveying wheel 6 in the delivery position in which the star-shaped conveying wheels 6 and 7 are adjacent to each other.

[(Patent Document 1] National Publication of International Patent Application No. 11-502175

[(Patent Document 2] National Publication of International Patent Application No. 2003-502238

Here, in the above described Patent Documents 1 and 2, the above described molding-devices and filling devices are respectively driven by the different drive sources, and they have the following problems.

First, in the case of Patent Document 2, when rotation of the star-shaped conveying wheel 7 is continued in the state in which the molding device abnormally stops and the star-shaped conveying wheel 6 stops, there arises the fear that the plastic bottle gripped by the gripper of the star-shaped conveying wheel 6 and the gripper of the star-shaped conveying wheel 7 interfere with each other in the above described delivery position of the plastic bottles, and the gripper is broken.

Therefore, when the molding device abnormally stops, the filling device also has to be stopped in Patent Document 2, and the process for the plastic bottles in the filling device cannot be performed.

Meanwhile, in the case of Patent Document 1, even if the molding device abnormally stops, the operation of the filling device can be continued since the conveying device 3 is provided between the molding device and filling device, but the length of the beverage manufacturing line becomes large by providing the conveying device 3, and there is the problem of increasing the size of the equipment.

SUMMARY OF THE INVENTION

In view of the above problems, the present invention provides an article conveying device in which even if one rotary wheel abnormally stops, the other rotary wheel can be continuously operated, without increasing the size of equipment.

Specifically, a first aspect of the present invention is, in an article conveying device in which a plurality of rotary wheels each provided with a plurality of grippers gripping articles equidistantly in a circumferential direction are disposed and in each delivery position in which these rotary wheels are adjacent to each other, articles are delivered from grippers of an upstream side rotary wheel to grippers of a downstream side rotary wheel, characterized by including retreating means switching the grippers provided at the downstream side rotary wheel between a use state in which the grippers receive articles from the upstream side rotary wheel and a retreat state in which the grippers do not interfere with the articles held by the upstream side rotary wheel, and control means controlling the retreating means, and characterized in that when the aforesaid upstream side rotary wheel abnormally stops, the aforesaid control means controls the aforesaid retreating means to switch at least the grippers of the downstream side rotary wheel, which are located in said delivery position, from the use state to the retreat state to prevent the grippers of the downstream side rotary wheel and the articles gripped by the grippers of the upstream side rotary wheel from interfering with one another, and rotation of the downstream side rotary wheel is continued to deliver the articles gripped by the grippers of the downstream side rotary wheel to a rotary wheel disposed further downstream.

Further, a second aspect of the present invention is, in an article conveying device in which a plurality of rotary wheels each provided with a plurality of grippers gripping articles equidistantly in a circumferential direction are disposed and in each delivery position in which these rotary wheels are adjacent to each another, articles are delivered from grippers of an upstream side rotary wheel to grippers of a downstream side rotary wheel, characterized by including retreating means switching the grippers provided at the upstream side rotary wheel between a use state in which the grippers deliver articles to the downstream side rotary wheel and a retreat state in which the grippers do not interfere with the articles held by the downstream side rotary wheel, and control means controlling the retreating means, and characterized in that when the aforesaid upstream side rotary wheel abnormally stops, the aforesaid control means controls the aforesaid retreating means to switch at least the grippers of the upstream side rotary wheel, which are located in the aforesaid delivery position, from the use state to the retreat state to prevent the grippers of the upstream side rotary wheel and the articles gripped by the grippers of the downstream side rotary wheel from interfering with one another, and rotation of the downstream side rotary wheel is continued to deliver the articles gripped by the grippers of the downstream side rotary wheel to a rotary wheel disposed further downstream.

Further, a third aspect of the present invention is, in an article conveying device in which a plurality of rotary wheels each provided with a plurality of grippers gripping articles equidistantly in a circumferential direction are disposed and in each delivery position in which these rotary wheels are adjacent to each other, articles are delivered from grippers of an upstream side rotary wheel to grippers of a downstream side rotary wheel, characterized by including retreating means switching the grippers provided at the downstream side rotary wheel between a use state in which the grippers receive articles from the upstream side rotary wheel and a retreat state in which the grippers do not interfere with the articles held by the upstream side rotary wheel, and control means controlling the retreating means, and characterized in that when the aforesaid downstream side rotary wheel abnormally stops, the aforesaid control means controls the aforesaid retreating means to switch at least the grippers of the downstream side rotary wheel, which are located in the aforesaid delivery position, from the use state to the retreat state to prevent the grippers of the downstream side rotary wheel and the articles gripped by the grippers of the upstream side rotary wheel from interfering with one another, and rotation of the upstream side rotary wheel is continued, and the articles gripped by the grippers of the upstream side rotary wheel are collected by collecting means provided to collect the articles.

A fourth aspect of the present invention is, in an article conveying device in which a plurality of rotary wheels each provided with a plurality of grippers gripping articles equidistantly in a circumferential direction are disposed and in each delivery position in which these rotary wheels are adjacent to each another, articles are delivered from grippers of an upstream side rotary wheel to grippers of a downstream side rotary wheel, characterized by including retreating means switching the grippers provided at the upstream side rotary wheels between a use state in which the grippers deliver articles to the downstream side rotary wheel and a retreat state in which the grippers do not interfere with the articles held by the downstream side rotary wheel, and control means controlling the retreating means, and characterized in that when the aforesaid downstream side rotary wheel abnormally stops, the aforesaid control means controls the aforesaid retreating means to switch at least the grippers of the upstream side rotary wheel which are located in the aforesaid delivery position from the use state to the retreat state to prevent the grippers of the upstream side rotary wheel and the articles gripped by the grippers of the downstream side rotary wheel from interfering with one another, and rotation of the upstream side rotary wheel is continued, and the articles gripped by the grippers of the upstream side rotary wheel are collected by collecting means provided to collect the articles.

According to the above described first to fourth aspects of the invention, the upstream side rotary wheel and the downstream side rotary wheel are provided in the positions adjacent to each other, and therefore, the conveying device 3 as in the Patent Document 1 is not required, and the equipment can be downsized.

According to the above described first invention, even if the upstream side rotary wheel abnormally stops, the grippers of the downstream side rotary wheel are switched to the retreat state from the use state by the retreating means, and the grippers of the downstream side rotary wheel and the articles gripped by the grippers of the upstream side rotary wheel do not interfere with each other.

In this case, the downstream side rotary wheel which does not abnormally stop can continue to operate as it is, and the articles gripped by the grippers of the downstream side rotary wheels can be directly delivered to the other rotary wheel which is disposed downstream.

Further, according to the above described second aspect of the invention, even if the upstream side rotary wheel abnormally stops, the grippers of the upstream side rotary wheel are switched to the retreat state from the use state by the retreating means, and the grippers of the downstream side rotary wheel and the articles gripped by the grippers of the upstream side rotary wheel do not interfere with each other.

In this case, the downstream side rotary wheel which does not abnormally stop can continue the operation as it is, and the articles gripped by the grippers of the downstream side rotary wheel can be directly delivered to the other rotary wheel disposed downstream.

Further, according to the above described third aspect of the invention, even if the downstream side rotary wheel abnormally stops, the grippers of the downstream side rotary wheel are switched to the retreat state from the use state by the retreating means, and the grippers of the downstream side rotary wheel and the articles gripped by the grippers of the upstream side rotary wheel do not interfere with each other.

At this time, the upstream side rotary wheel which does not abnormally stop can continue the operation as it is, but in this case, the articles gripped by the grippers of the upstream side rotary wheel are not delivered to the downstream side rotary wheel, and therefore, the articles are collected by the above described collecting means.

According to the above described fourth aspect of the invention, even if the downstream side rotary wheel abnormally stops, the grippers of the upstream side rotary wheel are switched to the retreat state from the use state by the retreating means, and the grippers of the downstream side rotary wheel and the articles gripped by the grippers of the upstream side rotary wheel do not interfere with each other.

At this time, the upstream side rotary wheel which does not abnormally stop can continue the operation as it is, but in this case, the articles gripped by the grippers of the upstream side rotary wheel are not delivered to the downstream side rotary wheel, and therefore, the articles are collected by the above described collecting means.

DETAILED DESCRIPTION OF THE EMBODIMENTS

Figure 1:
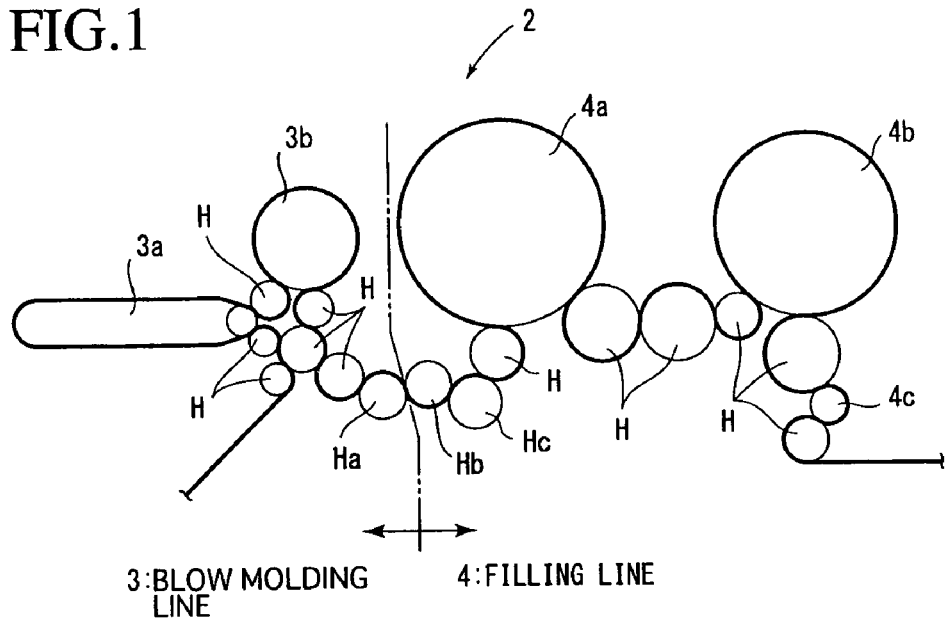
FIG. 1 is a plan view of a beverage manufacturing line according to this embodiment.

Describing embodiments shown in the drawings hereinafter, FIG. 1 shows a beverage manufacturing line 2 which carries out molding of a plastic bottle 1 as an article to filling of beverage. The beverage manufacturing line 2 includes a blow molding line 3 which blow-molds parison to be the plastic bottle 1, and a filling line 4 which performs treatment such as washing and filling of beverage for the plastic bottle 1 which is blow-molded. The beverage manufacturing line 2 is controlled by control means not illustrated.

The above described blow molding line 3 includes a preheater 3a which preheats the parison, and a blow molder 3b which blow-molds the parison to the plastic bottle 1. The filling line 4 includes a rinser 4a which washes the plastic bottle 1, a filler 4b which fills beverage in the plastic bottle 1, and a capper 4c which fits a cap to the plastic bottle 1.

The above described beverage manufacturing line 2 includes a plurality of rotary wheels H which convey the parison and the plastic bottles 1. The adjacent rotary wheels H are rotated in the opposite directions from one another, and thereby, convey the parison and the plastic bottles 1 along a path shown by the thick line in FIG. 1.

In this embodiment, the beverage manufacturing line 2 is divided into the above described blow molding line 3 and the filling line 4 at the position of the two-dot chain line in FIG. 1, and each of the blow molding line 3 and the filling line 4 is synchronously driven by at least one servomotor.

Figure 2:
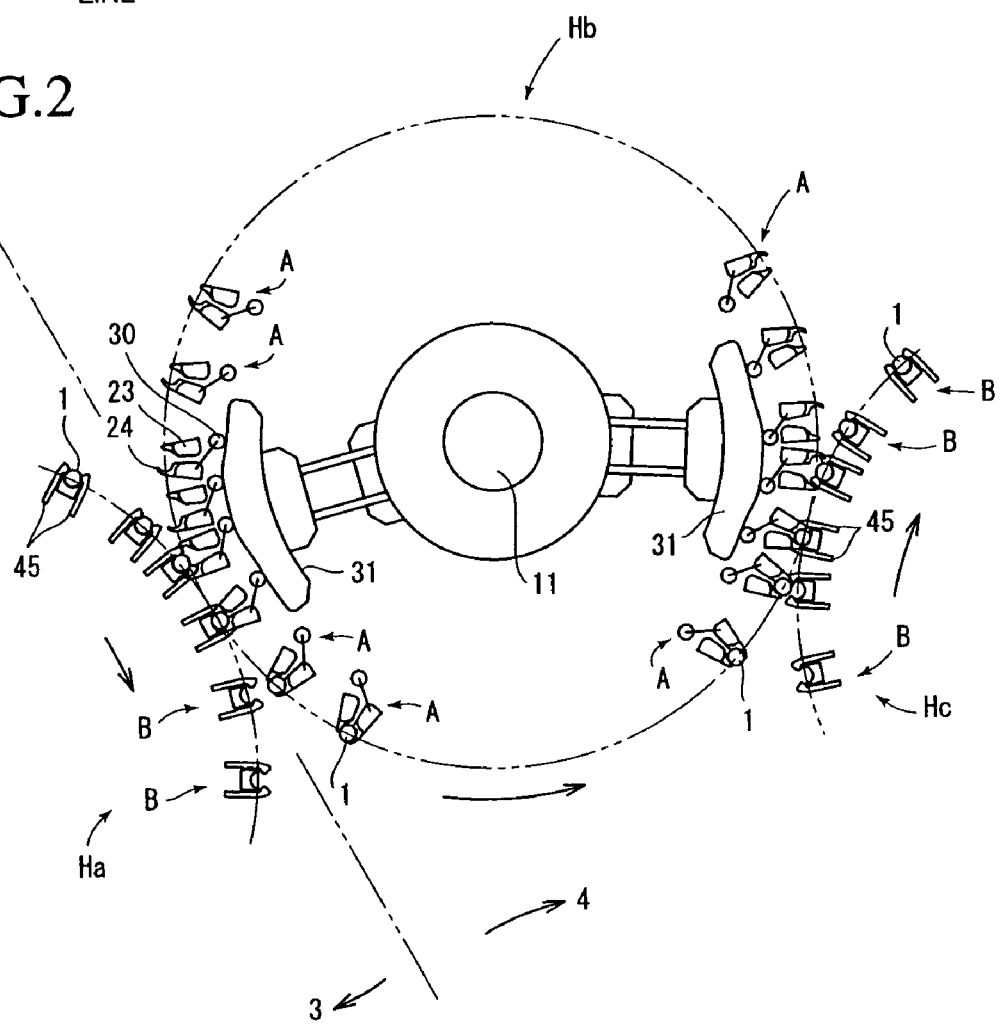
FIG. 2 is a plan view of an upstream side wheel and a downstream side wheel.

FIG. 2 shows rotary wheels H located in the boundary of the blow molding line 3 and the filling line 4. In the following description, the rotary wheel H at a downstream end of the blow molding line 3 will be called an upstream side wheel Ha, the rotary wheel H at an upstream side of the filling line 4 will be called a downstream side wheel Hb, and the rotary wheel H which is located further at a downstream side of the downstream side wheel Hb will be called a rotary wheel Hc.

Since the above described blow molding line 3 and the filling line 4 themselves are conventionally known, and therefore, the detailed description of the above described preheater 3a, blow molder 3b, rinser 4a, filler 4b and capper 4c will be omitted.

Describing the above described downstream side wheel Hb at first, the downstream side wheel Hb includes a base 11 fixed to the ground, a rotary table 12 which rotates around the base 11 in the counterclockwise direction shown in the drawing, and a plurality of grippers A having opening and closing mechanisms.

An encoder not illustrated is disposed in a rotary part of the above described downstream side wheel Hb, as rotational position detecting means, so that the above described control means recognizes the rotational position of each of the grippers A provided at the downstream side wheel Hb by pulses outputted by the encoder.

Next, by using FIGS. 3 to 7, the above described gripper A, and retreating means C which switches the gripper A between a use state in which it receives the plastic bottle 1 from the upstream side wheel Ha and a retreat state in which it retreats from the moving locus of the plastic bottle 1 held by the upstream side wheel Ha and does not interfere with the plastic bottle 1 will be described.

Figure 5:
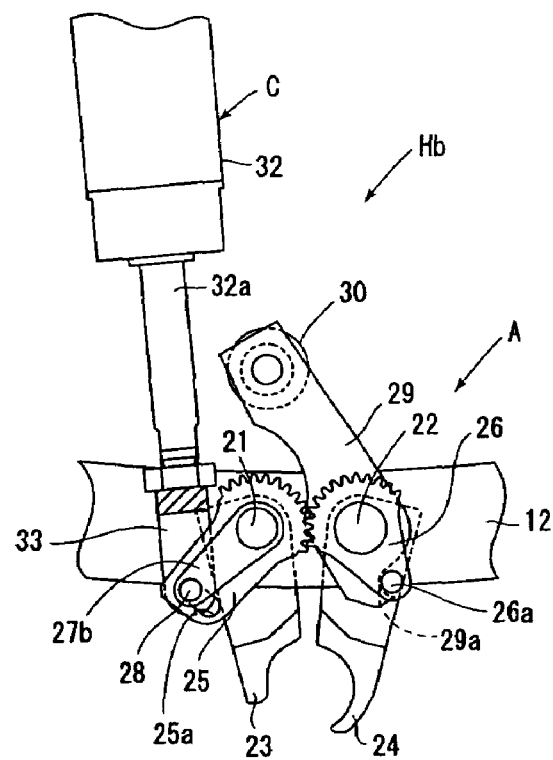
FIG. 5 is a plan view of the gripper A, which is a view showing a state in which the gripper A is closed in a use state.
Figure 6:
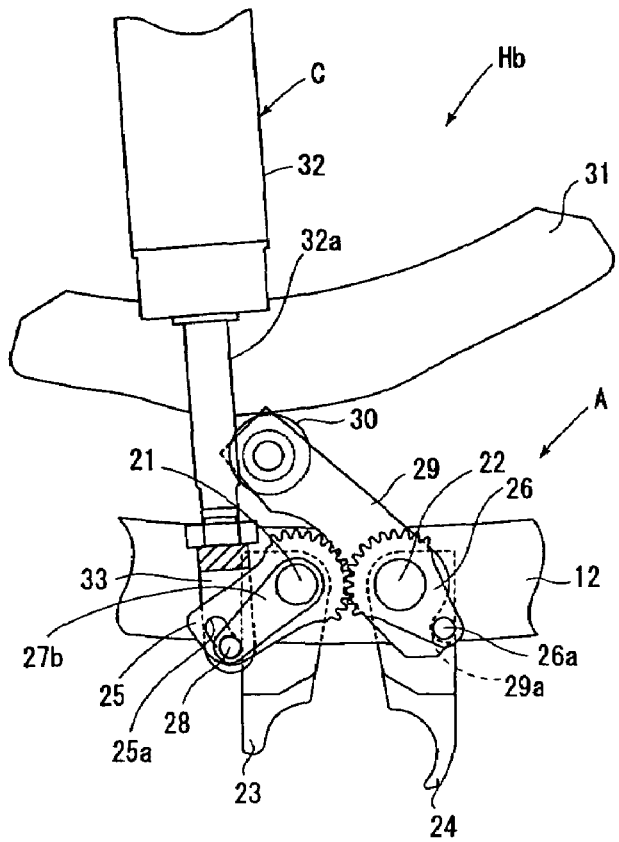
FIG. 6 is a plan view of the gripper A, which is a view showing a state in which the gripper A is opened in the use state.
Figure 7:
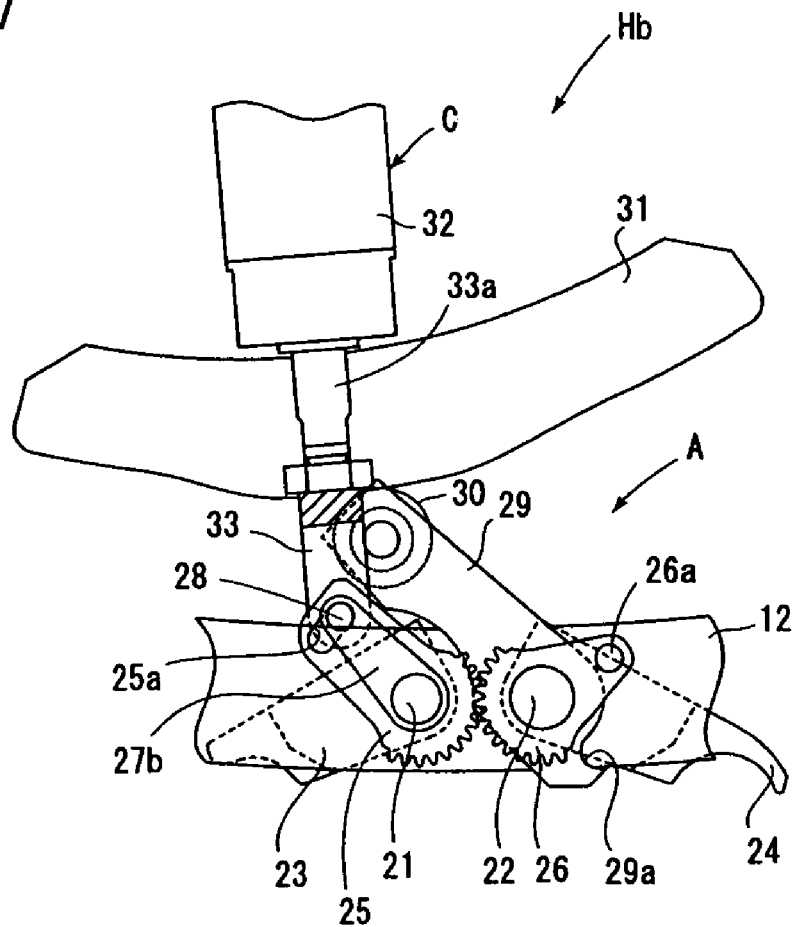
FIG. 7 is a plan view of the gripper A, which is a view showing a state in which the gripper A is kept in an opened state in a retreat state.

The grippers A shown in FIGS. 5 and 6 among them are in a use state by the retreating means C, and the gripper A shown in FIG. 7 is in a retreated state by the retreating means C. In FIGS. 5 to 7, the gripper A is moved in the right direction from the left shown in the drawings.

The gripper A includes two first and second rotary shafts 21 and 22 axially supported rotatably by two plates 12a and 12b constituting the rotary table 12, a first grip member 23 fixed to the first rotary shaft 21, a second grip member 24 fixed to the second rotary shaft 22, a first gear member 25 fixed to the first rotary shaft 21, a second gear member 26 fixed to the second rotary shaft 22, and biasing means 27 which is provided at the above described first rotary shaft 21 and biases the first and second grip members 23 and 24 in the closing direction.

The above described first and second rotary shafts 21 and 22 are axially supported by the above described plates 12a and 12b via bearings respectively. Lower end portions of the first and second rotary shafts 21 and 22 are projected downward through the lower plate 12b, and to their tip ends, base end portions of the above described first and second grip members 23 and 24 are fixed respectively.

The above described first and second grip members 23 and 24 grip a neck portion 1a of the plastic bottle 1 from left and right sides, and a tip end of the first grip member 23 is made shorter than a tip end of the second grip member 24 so as to be in a preferable shape for delivering the plastic bottle 1.

The above described first and second gear members 25 and 26 are located between the above described plates 12a and 12b, the first gear member 25 is fixed to the first rotary shaft 21 to be rotated integrally with the first grip member 23, whereas the second gear member 26 is fixed to the second rotary shaft 22 to be rotated integrally with the second grip member 24.

Gears are formed on the first and second gear members 25 and 26 to be meshed with each other, and when the first gear member 25 rotates around the first rotary shaft 21 to open or close the first grip member 23, the second gear member 26 operates with this and rotates around the second rotary shaft 22 to open or close the second grip member 24.

The above described biasing means 27 is constituted of a sleeve 27a fixed to an upper end of the first rotary shaft 21, a transmitting member 27b axially supported rotatably by the first rotary shaft 21 at an upper portion of the above described first gear member 25, and a spring member 27c resiliently fitted between the sleeve 27a and the transmitting member 27b. In FIGS. 5 to 7, illustrations of the sleeve 27a and the spring member 27c are omitted.

In the above described first gear member 25, a long hole 25a vertically penetrating through the first gear member 25 is formed, and a through-hole 27d is vertically formed in the above described transmitting member 27b. A connecting rod 28 is inserted into the long hole 25a and the through-hole 27d.

The connecting rod 28 is movable along the long hole 25a, and therefore, the first gear member 25 and the transmitting member 27b are mutually rotatable around the first rotary shaft 21 within the range of the long hole 25a.

The above described spring member 27c biases the above described first gear member 25 counterclockwise with respect to the transmitting member 27b, as a result of which, the first grip member 23 is kept in the closed state by the spring member 27c, and the second grip member 24 is linked to this and is also kept in the closed state as shown in FIG. 5.

The above described gripper A also includes a pin 26a provided at the above described second gear member 26, an engaging member 29 axially supported rotatably by the second rotary shaft 22, and a cam follower 30 provided at one end of the engaging member 29, and the cam follower 30 is engaged with a cam 31 fixed to the base 11.

A substantially hook-shaped engaging part 29a which engages with the above described pin 26a is formed at a tip end of the above described engaging member 29. When the engaging member 29 is rotated around the second rotary shaft 22 in the counterclockwise direction in the drawings, the engaging part 29a engages with the pin 26a.

Meanwhile, the above described cam follower 30 is provided at the other end of the engaging member 29, and when the cam follower 30 engages with the above described cam 31 and moves to the outer circumferential side of the rotary table 12, it rotates the engaging member 29 in the counterclockwise direction in the drawings.

Therefore, when the cam follower 30 and the cam 31 are engaged with each other, the engaging member 29 presses the pin 26a in the counterclockwise direction via the engaging part 29a, and as a result, the second gear member 26 rotates against the biasing force of the above described biasing means 27. Therefore, the second grip member 24 is opened as shown in FIG. 6, and the first grip member 23 is linked to it and is also opened.

The above described retreating means C is constituted of an air cylinder 32 as drive means, and a connecting member 33 in a substantially horseshoe shape, which is provided at a tip end of a rod 32a of the air cylinder 32, and holds the above described connecting rod 28.

A base portion of the above described air cylinder 32 is rotatably held by the above described rotary table 12 and is connected to an air supply source not illustrated. The above described rod 32a is extended as shown in FIGS. 5 and 6 when the gripper A is brought into a use state and is contracted as shown in FIG. 7 when it is brought into a retreat state, by the control of the above described control means.

Since the above described connecting rod 28 is inserted into the long hole 25a of the first gear member 25 as described above, and when the connecting rod 28 is moved into the retreat state from the use state by the air cylinder 32, the first gear member 25 is linked to this and rotates to bring the first and second grip members 23 and 24 into the opened state.

As shown in FIGS. 5 and 6, the rod 32a of the air cylinder 32 keeps the extended state to hold the connecting rod 28 in a predetermined position in the use state, and allows the above described first and second grip members 23 and 24 to operate to open and close against the biasing force of the above described biasing means 27.

As shown in FIGS. 6 and 7, comparing the opening degrees of the first and second grip members 23 and 24 in the use state with the opening degrees in the retreat state, the opening degrees in the retreat state are larger.

Figure 3:
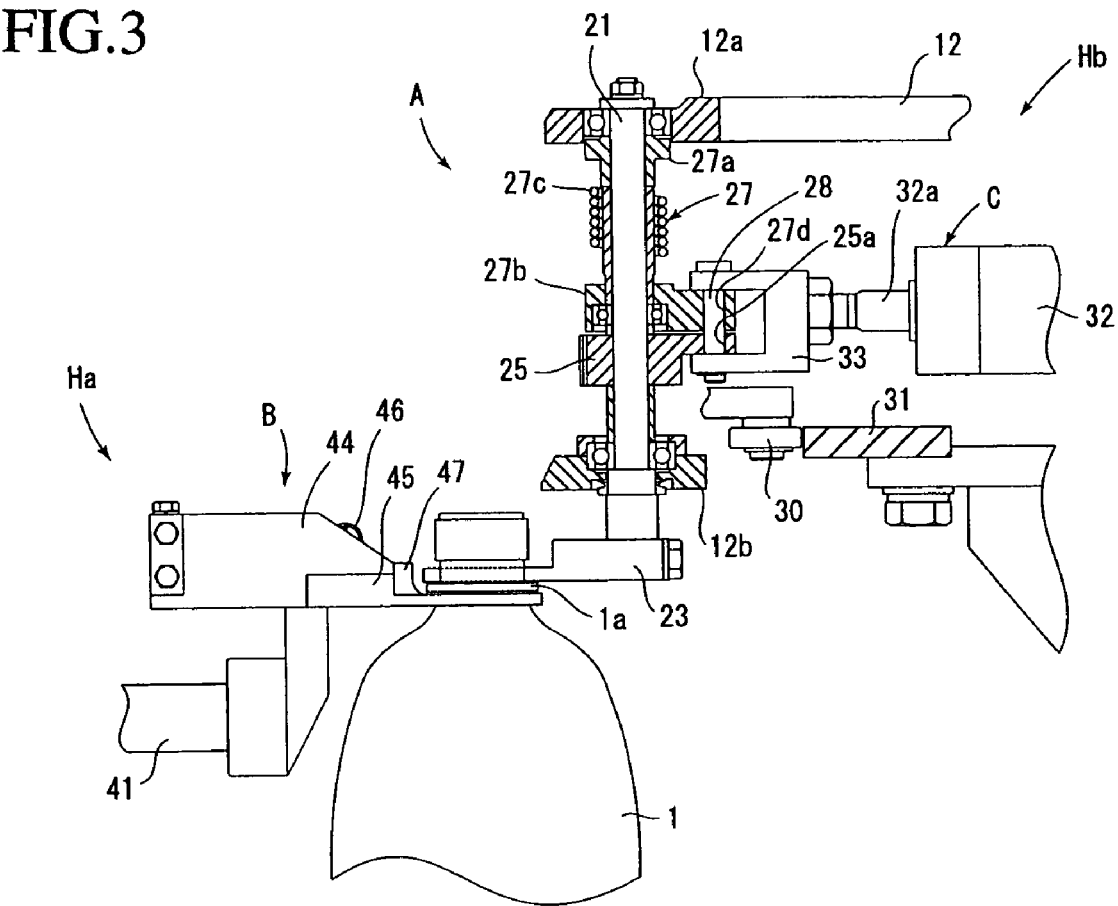
FIG. 3 is a sectional view of a gripper A.
Figure 4:
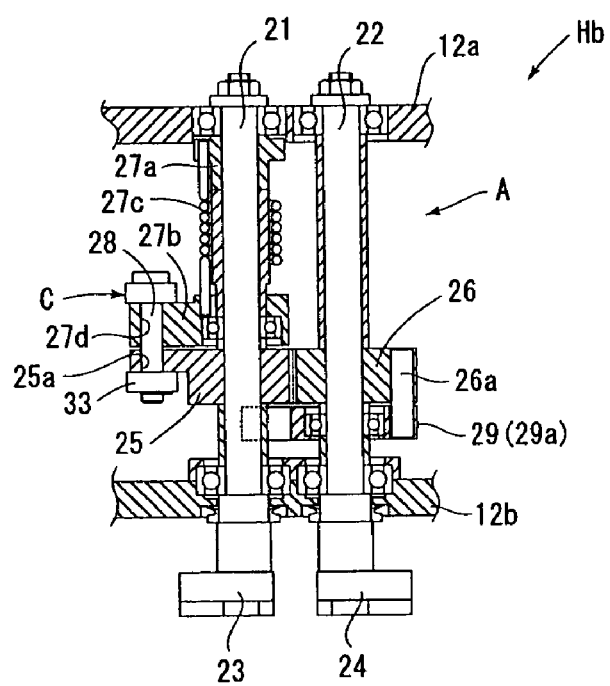
FIG. 4 is a front view of the gripper A.

Next, the above described upstream side wheel Ha will be described. As shown in FIG. 3, the upstream side wheel Ha includes a base (not illustrated) fixed to the ground, a rotary table 41 which rotates in the counterclockwise direction in the drawing with respect to the base, and a plurality of grippers B which are provided at the rotary table 41 equidistantly in the circumferential direction and do not perform opening and closing operations for themselves.

Figure 8:
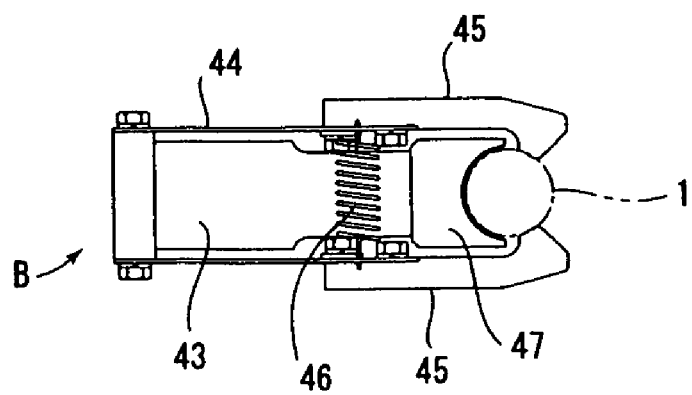
FIG. 8 is a plan view of a gripper B.

As shown in FIGS. 3 and 8, the gripper B is constituted of a stay 43 fixed to the rotary table 41, two plate springs 44 provided at both sides of the stay 43, a grip member 45 provided at a tip end of each of the plate springs 44, a spring 46 which biases the above described grip members 45 in the direction to move close to each other, and a support member 47 provided between both the grip members 45.

The above described grip member 45 grips the plastic bottle 1 at the position lower than the neck portion 1a which the above described gripper A grips, and a tip end of it is in a hooked shape for preventing it from falling off.

The grip members 45 in the gripper B are always biased in the closing direction by the above described plate springs 44 and the spring 46, and therefore, when gripping and releasing the plastic bottle 1, the above described grip members 45 need to be forcefully opened against the biasing forces of the above described plate springs 44 and spring 46.

The rotary wheel Hc adjacent to the above described downstream side wheel Hb downstream from it also has substantially the same constitution as the upstream side wheel Ha, and includes grippers B similar to the grippers B of the above described upstream side wheel Ha.

Hereinafter, an operation of the beverage manufacturing line 2 having the above described constitution will be described.

First, the operation when the beverage manufacturing line 2 is normally operated, and the upstream side and downstream side wheels Ha and Hb are normally operated will be described.

First, the plastic bottle 1 is supplied to the gripper B of the upstream side wheel Ha from the rotary wheel H adjacent to it at the upstream side, and the gripper B, which is in the state of gripping the plastic bottle 1, moves to the position adjacent to the above described downstream side wheel Hb by rotation of the rotary table 41.

Meanwhile, the gripper A of the above described downstream side wheel Hb is kept in the use state by the above described retreating means C. When the gripper A approaches the position adjacent to the upstream side wheel Ha by rotation of the rotary wheel 12, the above described cam follower 30 engages with the above described cam 31, and the first and second grip members 23 and 24 open.

Thereafter, the first and second grip members 23 and 24 have the maximum opening degree in the use state shown in FIG. 6 at the position a little near to the upstream side from the position in which the upstream side wheel Ha and the downstream side wheel Hb are the closest to each other.

When the gripper A reaches the position in which the first and second grip members 23 and 24 form the maximum opening degree, the gripper B locates the plastic bottle 1 between the first and second grip members 23 and 24.

Thereafter, the cam follower 30 is moved to the outer circumferential side by the cam 31, and the first and second grip members 23 and 24 are closed by the biasing force of the biasing means 27. Subsequently, in the position in which both the wheels Ha and Hb are the closest to each other, the first and second grip members 23 and 24 are in the closed state shown in FIG. 5, and at this instant, the gripper B and the gripper A are in the state in which they grip the plastic bottle 1 simultaneously.

Further, thereafter, the gripper B and the gripper A move away from each other, and since at this time, the plastic bottle 1 is gripped by the gripper A, the grip members 45 of the gripper B are pressed to be opened by the plastic bottle 1. Finally, the plastic bottle 1 is released from the gripper B, and delivery of the plastic bottle 1 is completed.

Thus, for delivery of the plastic bottle 1, the plastic bottle 1 needs to be simultaneously gripped with the gripper B and the gripper A, and therefore, the locus of the gripper B by the upstream side wheel Ha and the locus of the gripper A by the downstream side wheel Hb have to overlap one another.

Hereinafter, such a range in which the locus of the gripper B and the locus of the gripper A overlap one another and delivery of the plastic bottle 1 is performed will be called a delivery position for the plastic bottle 1.

Such a delivery position exists between the downstream side wheel Hb and the rotary wheel Hc adjacent to it downstream from it, and delivery of the plastic bottle 1 from the gripper A of the downstream side wheel Hb to the gripper B of the rotary wheel Hc is performed.

In this case, the first and second grip members 23 and 24 of the gripper A keep the closed state up to the position in which the downstream side wheel Hb and the rotary wheel Hc are the closest to each other, and just before this position, the plastic bottle 1 which the gripper A grips presses and opens the grip members of the gripper B of the rotary wheel Hc.

Then, in the position in which both the wheels Hb and Hc are the closest to each other, the gripper A and the gripper B simultaneously grip the plastic bottle 1. Thereafter, the cam follower 30 and the cam 31 are engaged with each other and the first and second grip members 23 and 24 are opened. The plastic bottle 1 is released from the gripper A and delivery is completed.

Next, the operation when abnormality occurs to the beverage manufacturing line 2 will be described.

First, when the blow molding line 3 is abnormally stops, the operation of the filling line 4 is desired to be continued until the treatment of the plastic bottle 1 at least in the filling line 4 is finished from the viewpoint of hygiene. When the filling line 4 abnormally stops, the operation of the blow molding line 3 is desired to be continued until at least the plastic bottle 1 in the blow molder 3b is discharged from the viewpoint of prevention of damage of the blow molder 3b.

Here, the blow molding line 3 and the filling line 4 of this embodiment are driven by the different servo motors, and therefore, even if one device stops, the operation of the other device can be continued.

However, the locus of the gripper B and the locus of the gripper A overlap one another in the above described delivery position as described above, and therefore, when the upstream side wheel Ha stops with abnormal stoppage of, for example, the blow molding line 3, if the downstream side wheel Hb of the filling line 4 is rotated continuously, there is the fear that the grippers A interfere with the plastic bottles 1 gripped by the grippers B, and the grippers are broken.

In this case, if the conveying device is provided between the blow molding line 3 and the filling line 4 as in the above described Patent Document 1, such a problem can be solved, but there arises the problem that the beverage manufacturing line 2 becomes long.

Thus, in this embodiment, even if one wheel abnormally stops, it is made possible to operate the other wheel continuously by switching the above described grippers A to the retreat state from the use state by the retreating means C.

First, an operation when the blow molding line 3 abnormally stops, and the upstream side wheel Ha abnormally stops will be described.

When the above described molding line 3 abnormally stops, the control means which detects this immediately controls the retreating means C of the gripper A of the downstream side wheel Hb which is located in the above described delivery position to switch the gripper A from the use state to the retreat state.

More specifically, the control means always recognizes the position of each of the grippers A by a pulse from the encoder provided in the rotary part of the downstream side wheel Hb.

When the blow molding line 3 abnormally stops, the control means controls the air cylinder 32 constituting the retreating means C of the gripper A which is located in the delivery position that is set in advance to cause the rod 32a to contract.

Thereby, the first and second grip members 23 and 24 are kept in the opened state as shown in FIG. 7. The opening degree of the first and second grip members 23 and 24 in this opened state is larger than the opening degree in the above described use state, and therefore, the tip ends of the first and second grip members 23 and 24 are located at the inner circumferential side of the rotary table 12 from the position when they are in the use state.

Therefore, the first and second grip members 23 and 24 of the gripper A which are brought into the retreat state can pass without interfering with the plastic bottle 1 held by the gripper B stopping in the above described delivery position.

In this retreat state, the engaging part 29a and the above described pin 26a do not engage with each other as shown in FIG. 7, and therefore, the engaging member 29 is prevented from interfering with the other members such as the first rotary shaft 21 even when the first and second grip members 23 and 24 are widely opened.

Here, some of the grippers A located in the delivery position have already received the plastic bottle 1 from the gripper B, and in this case, if such a gripper A is brought into the retreat state, the plastic bottle 1 is released and drops.

Thus, a collection box as collecting means not illustrated is provided below the delivery position to collect the plastic bottles 1 which have dropped.

The grippers A located at a downstream side from the above described delivery position and located upstream from the delivery position with the downstream rotary wheel Hc grip the plastic bottles 1 at the time of stoppage of the upstream side wheel Ha, and therefore, these grippers A deliver the plastic bottles 1 to the grippers B of the rotary wheel Hc while being kept in the use state.

When the grippers A located downstream from the delivery position to the rotary wheel Hc at the time of stoppage of the upstream side wheel Ha and the grippers A which have transferred the plastic bottles 1 to the rotary wheel Hc in the above described delivery position reach a predetermined position at the upstream side of the above described delivery position by rotation of the rotary table 12 thereafter, they are switched to the retreat state form the use state in sequence, and are kept in the retreat state until the beverage manufacturing line 2 is recovered thereafter.

Next, an operation when the filling line 4 abnormally stops, and the downstream side wheel Hb abnormally stops will be described.

When the above described filling line 4 abnormally stops, the control means which detects it immediately controls the retreating means C of the gripper A located in the above described delivery position, and switches the gripper A to the retreat state from the use state.

Therefore, the plastic bottle 1 which is gripped by the gripper B can pass without interfering with the first and second grip members 23 and 24 of the gripper A which is stopping and in the retreat state.

Here, the plastic bottle 1 gripped by the gripper A located in the delivery position drops because the first and second grip members 23 and 24 are in the opened state, and is collected in the above described collection box.

Meanwhile, the plastic bottle 1 gripped by the above described gripper B is not delivered to the gripper A since the above described gripper A is in the retreat state, and is conveyed past the delivery position.

In this embodiment, a discharge bar not illustrated as collecting means is provided at a downstream side from the above described delivery position, and when the plastic bottle 1 abuts on the discharge bar, the grip members 45 of the above described gripper B are pressed and opened by the plastic bottle 1, and grip on the plastic bottle 1 is forcefully released.

As a result, the plastic bottle 1 is released from the gripper B, and drops in a collection box provided near the discharge bar to be collected.

Instead of the collection box, a conveyor can be disposed to convey the plastic bottle 1 which has dropped thereon to a predetermined position.

Second Embodiment

Figure 9:
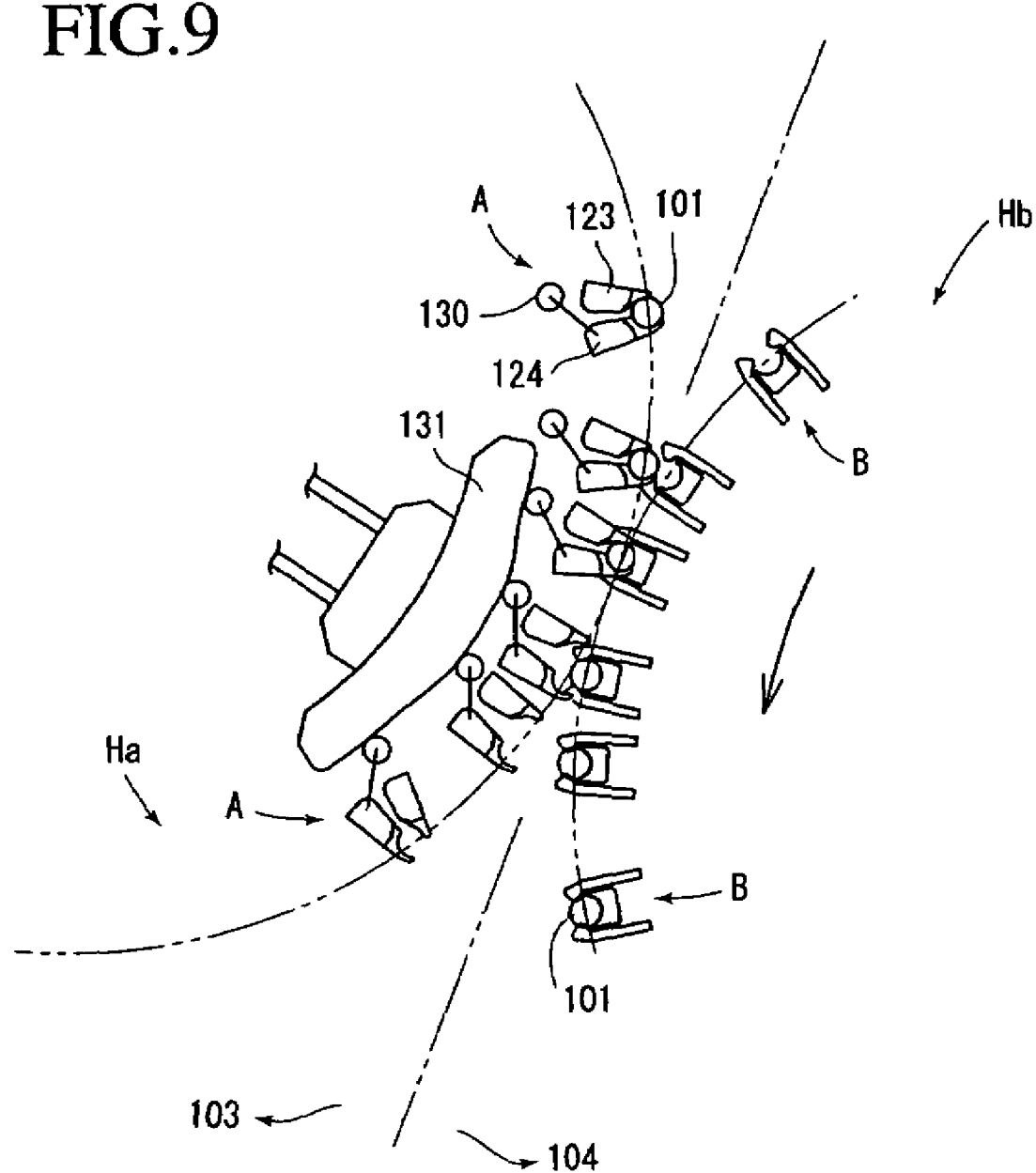
FIG. 9 is a plan view of an upstream side wheel and a downstream side wheel according to a second embodiment.

Next, a second embodiment according to the present invention will be described by using FIG. 9. The members common to those in the above described first embodiment will be described by adding 100 to each of the reference numerals used in the first embodiment.

In the above described first embodiment, the grippers A each having the opening and closing mechanism are provided at the downstream side wheel Hb, but a beverage manufacturing line 2 of the second embodiment adopts a constitution in which the grippers A each having the opening and closing mechanism are provided at the upstream side wheel Ha and the grippers B which do not perform opening and closing operations for themselves are provided at the downstream side wheel Hb.

The upstream side wheel Ha in this embodiment includes the grippers A and the retreating means C having the same constitutions as those of the grippers A and the retreating means C in the above described first embodiment, and the downstream side wheel Hb includes the grippers B having the same constitutions as those of the grippers B in the above described first embodiment.

Hereinafter, an operation of the beverage manufacturing line having the above described constitution will be described.

First, when the beverage manufacturing line is normally operated, the gripper A of the upstream side wheel Ha is kept in the use state by the retreating means C, and a plastic bottle 101 is delivered from the gripper A to the gripper B in the similar procedure to that followed when the plastic bottle 1 is delivered to the gripper B of the rotary wheel Hc from the gripper A of the downstream side wheel Hb in the above described first embodiment.

Next, when a blow molding line 103 abnormally stops and the upstream side wheel Ha abnormally stops, the control means switches the gripper A located in the delivery position to the retreat state from the use state by the retreating means C. (See FIG. 7)

Therefore, the plastic bottle 101 which is already gripped by the gripper B can pass without interfering with first and second grip members 123 and 124 of the gripper A which stop and are brought into the retreat position.

Here, the plastic bottle 101 which is gripped by the gripper A located in the delivery position drops since the first and second grip members 123 and 124 are brought into the opened state, and is collected into a collection box as collecting means which is installed below the delivery position.

When the filling line 104 abnormally stops and the downstream side wheel Hb abnormally stops, the control means switches the gripper A located in the delivery position by the retreating means C to the retreat state from the use state.

As a result, the first and second grip members 123 and 124 are brought into the opened state, and the plastic bottle 101 gripped by the gripper A drops into the above described collection box. Therefore, the plastic bottle 101 which is gripped by the first and second grip members 123 and 124 of the gripper A does not interfere with the grip member of the gripper B which stops in the above described delivery position.

Since the upstream side wheel Ha continues to rotate, the gripper A which newly reaches the delivery position by the rotation of a rotary table 112 is also switched to the retreat state by the retreating means C, and the plastic bottle 101 gripped by the gripper A also drops into the collection box to be collected.

The gripper A which passes the delivery position is switched to the use state from the retreat state again by the retreating means C, and the gripper A receives the plastic bottle 101 from the rotary wheel H adjacent to the upstream side of the upstream side wheel Ha.

Third Embodiment

Next, a third embodiment according to the present invention will be described by using FIGS. 10 and 11.

In this third embodiment, the constitutions of the gripper A and the retreating means C differ from those of the above described first embodiment. The difference will be described hereinafter, and the members corresponding to respective members of the above described first embodiment will be described by adding 200 to each of the reference numerals used in the first embodiment.

The gripper A has an opening and closing mechanism, and includes a first grip member 223 fixed to a first rotary shaft 221, a second grip member 224 fixed to a second rotary shaft 222, a first gear member 225 fixed to the first rotary shaft 221, a second gear member 226 fixed to the second rotary shaft 222, and biasing means not illustrated which is provided at the above described first rotary shaft 221 to bias the first and second grip members 223 and 224 in a closing direction.

The second grip member 224 is provided with an arm part 224a toward an inner circumferential side of a rotary table 212, and a cam follower 230 is provided at a tip end of the arm part 224a.

When the cam follower 230 moves to an outer circumferential side of the rotary table 212, the second grip member 224 rotates around the second rotary shaft 222, and the first and second grip members 223 and 224 are opened.

Cams 231 are provided respectively at a delivery position of the plastic bottles by the upstream side wheel Ha and the downstream side wheel Hb, and a delivery position of the plastic bottles by the downstream side wheel Hb and the rotary wheel Hc.

The retreating means C of this embodiment is a moving mechanism 232 which moves the cam 231 provided at the delivery position for the above described upstream side wheel Ha and the downstream side wheel Hb, and for the moving mechanism 232, for example, an air cylinder can be used.

Figure 10:
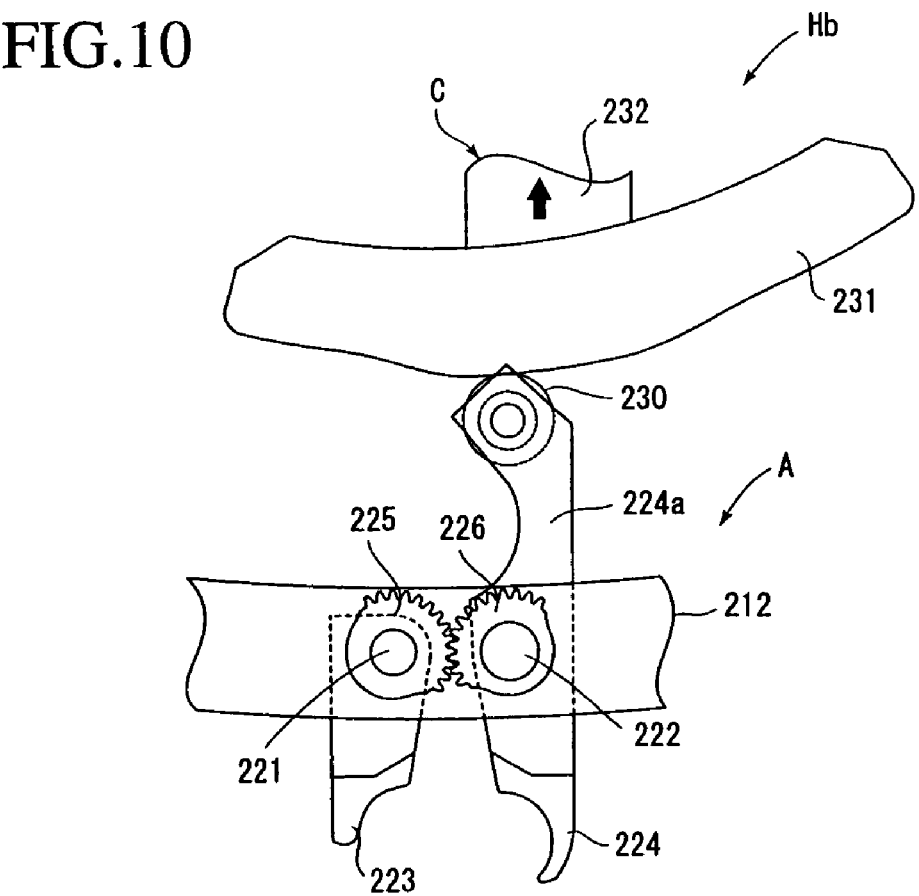
FIG. 10 is a plan view of a gripper A according to a third embodiment, which is a view showing a state in which the gripper A is opened in the use state.
Figure 11:
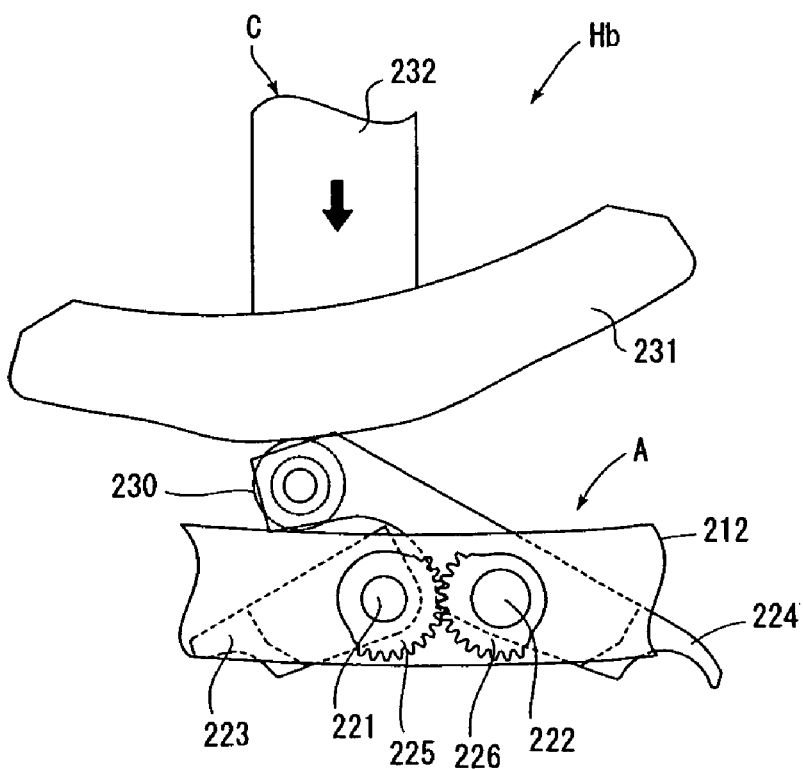
FIG. 11 is a plan view of the gripper A according to the third embodiment, which is a view showing a state in which the gripper A is opened in the retreat state.

When the beverage manufacturing line is normally operated, the moving mechanism 232 locates the cam 231 in the use position as shown in FIG. 10, and when a blow molding line or a filling line abnormally stops, it locates the cam 231 in the retreat position as shown in FIG. 11.

Since the position of the outer circumferential surface of the cam 231 moves in the radial direction of the rotary table 212 by moving the cam 231 to the retreat position from the use position, the moving amount of the above described cam follower 230 increases, and the opening degree of the first and second grip members 223 and 224 can be made large.

Describing more specifically, the opening degree of the first and second grip members 223 and 224 when the cam 231 is located in the use position is the opening degree optimal for receiving a plastic bottle from the gripper B of the upstream side wheel Ha in the delivery position.

Meanwhile, the opening degree of the first and second grip members 223 and 224 when the cam 231 is located in the retreat position is larger as compared with the opening degree when the cam 231 is located in the above described use position.

Therefore, by bringing the gripper A into the retreat state from the use state, tip ends of the first and second grip members 223 and 224 can be prevented from interfering with the plastic bottle gripped by the gripper B of the upstream side wheel Ha.

When any one of the upstream side wheel Ha and the downstream side wheel Hb abnormally stops, operation of the other wheel can be also continued by the gripper A and the retreating means C which have the above constitutions, as in the case of the above described first embodiment.

In this third embodiment, as in the relation of the above described first embodiment and second embodiment, the constitution in which the upstream side wheel Ha is provided with the grippers A having the opening and closing mechanisms and the retreating means C, and the downstream side wheel Hb is provided with the grippers B which do not perform opening and closing operations for themselves may be adopted.

Fourth Embodiment

Figure 12:
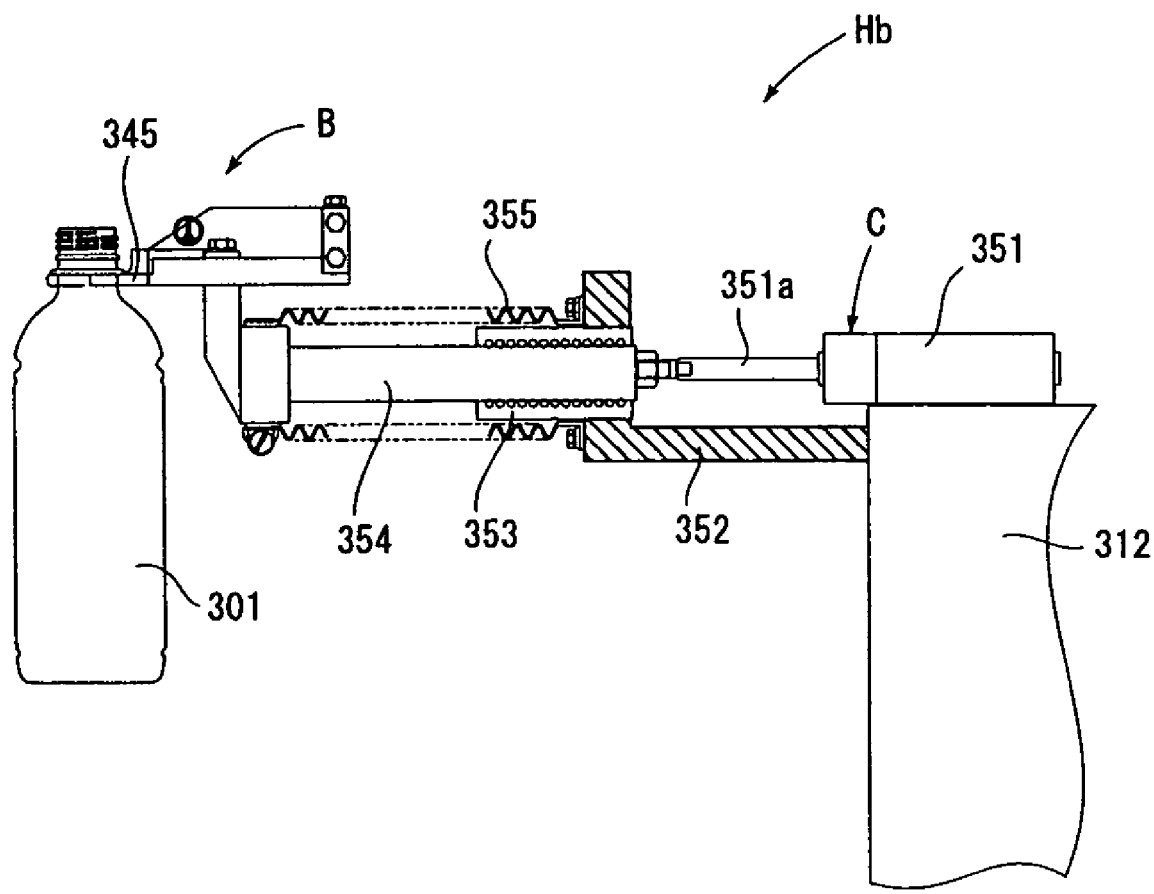
FIG. 12 is a sectional view of a downstream side wheel according to a fourth embodiment.

Next, by using FIG. 12, a fourth embodiment according to the present invention will be described. In the following description, the members corresponding to the respective members of the above described first embodiment will be described by adding 300 to each of the reference numerals used in the first embodiment.

The upstream side wheel Ha of this embodiment is provided with the grippers A each having an opening and closing mechanism, and the downstream side wheel Hb is provided with the grippers B which have the same constitutions as the grippers B in the above described first embodiment and do not perform opening and closing operations for themselves.

In this embodiment, the retreating means C is provided at the gripper B which does not perform an opening and closing operation for itself.

The retreating means C includes an air cylinder 351 provided at a rotary table 312, a cylindrical bearing member 353 fixed to the rotary table 312 via a stay 352, and a moving member 354 which advances and retreats in the above described bearing member 353 with the above described air cylinder 351 connected to a base end portion and the above described gripper B connected to a tip end portion.

Each of the air cylinders 351 extends and contracts the rod 351a in the radial direction of the rotary table 312, and advances and retreats the above described moving member 354 in the radial direction to be able to move the gripper B to the use position at an outer circumferential side of the rotary table 312 and the retreat position at an inner circumferential side.

A plurality of bearings are provided inside the above described bearing member 353, the moving member 354 and the bearing member 353 are covered with a bellows-shaped protection member 355.

An operation of the beverage manufacturing line having the above described constitution will be described.

Firstly, when the beverage manufacturing line is normally operated, the above described retreating means C extends the rod 351a of the air cylinder 351 to locate the gripper B in the use position and brings it into a use state.

By bringing the gripper B into the use state, a plastic bottle 301 is delivered in the delivery position for the upstream side wheel Ha and the downstream side wheel Hb in the similar procedure as that for the delivery of the plastic bottle 1 between the downstream side wheel Hb and the rotary wheel Hc in the above described first embodiment.

Next, when the blow molding line abnormally stops, and the upstream side wheel Ha abnormally stops, the control means which detects it immediately controls the retreating means C of the gripper B located in the delivery position to switch the gripper B to a retreat state from the use state.

More specifically, the control means recognizes the position of each of the grippers B by a pulse from an encoder provided in a rotary part of the downstream side wheel Hb, and moves the gripper B located in the range of the delivery position which is set in advance to the retreat position from the above described use position.

Thereby, the plastic bottle 301 held by the gripper A which stops in the above described delivery position and grip members 345 of the gripper B are prevented from interfering with each other, and the plastic bottle 301 which is gripped by the gripper B and rotationally conveyed is prevented from interfering with the first and second grip members of the gripper A.

Here, some of the grippers B which move to the above described retreat position receive the plastic bottles 301 from the grippers A, and therefore, the control means moves the grippers B which are retreated when the upstream side wheel Ha abnormally stops to the use position again after the grippers B pass the receiving position to cause them to deliver the plastic bottles 301 to the downstream side rotary wheel Hc.

An operation when the filling line abnormally stops and the downstream side wheel Hb abnormally stops will be described.

In this case, the control means also controls the air cylinder 351 to move the grippers B to the retreat position from the normal position.

By bringing the gripper B into the retreat state like this, the plastic bottle 301 gripped by the gripper A and the gripper B are prevented from interfering with each other, or the gripper A is prevented from interfering with the plastic bottle 301 which the gripper B holds.

In this case, the plastic bottle 301 is not received by the gripper B in the delivery position, and therefore, the plastic bottle 301 drops from the gripper A in the delivery position so that the plastic bottle 301 drops into a collection box provided near the delivery position.

Fifth Embodiment

Hereinafter, a fifth embodiment according to the present invention though not illustrated will be described. Whereas in the above described fourth embodiment, the above described grippers B which do not perform opening and closing operations for themselves and retreating means C are provided at the downstream side wheel Hb, the fifth embodiment has a constitution in which the upstream side wheel Ha is provided with the grippers B which do not perform opening and closing operations for themselves and the retreating means C, as the relation of the first embodiment and the second embodiment.

First, when the beverage manufacturing line is normally operated, the gripper B of the upstream side wheel Ha is located in a use position by the retreating means C, and the plastic bottle is delivered from the gripper B to the gripper A which is provided at the downstream side wheel Hb and has the opening and closing mechanism.

Next, when the blow molding line abnormally stops and the upstream side wheel Ha abnormally stops, the control means moves the gripper B located in the delivery position to a retreat position by the retreating means C.

Therefore, the plastic bottle gripped by the gripper B which stops in the above described delivery position and the gripper A are prevented from interfering with each other, and the plastic bottle which is gripped by the gripper A to be rotationally conveyed is prevented from interfering with the gripper B.

Next, when the filling line abnormally stops, and the downstream side wheel Hb abnormally stops, the control means moves the gripper B located in the delivery position to the retreat position by the retreating means C.

Therefore, the grip members of the gripper A which stops in the above described delivery position and the plastic bottle gripped by the gripper B are prevented from interfering with each other.

Here, the plastic bottle held by the gripper B passes the delivery position without being delivered to the gripper A, and therefore, the control means returns the gripper B which has passed the delivery position from the retreat state to the use state again.

Thereafter, by an excluding bar as collecting means provided on the moving path of the plastic bottles, grip on the plastic bottle by the gripper B is forcefully removed, and the excluded plastic bottle is collected by the collection box.

What is claimed is:

1. An article conveying device in which a plurality of rotary wheels each provided with a plurality of grippers gripping articles equidistantly in a circumferential direction are disposed and in a delivery position in which these rotary wheels are adjacent to each other, articles are delivered from grippers of an upstream side rotary wheel to grippers of a downstream side rotary wheel, comprising:

retreating means switching the grippers provided at the downstream side rotary wheel between a use state in which the grippers receive articles from the upstream side rotary wheel and a retreat state in which the grippers do not interfere with the articles held by the upstream side rotary wheel; and control means controlling the retreating means, wherein when said upstream side rotary wheel abnormally stops, said control means controls said retreating means to switch at least the grippers of the downstream side rotary wheel, which are located in said delivery position, from the use state to the retreat state to prevent the grippers of the downstream side rotary wheel and the articles gripped by the grippers of the upstream side rotary wheel from interfering with one another, and rotation of the downstream side rotary wheel is continued to deliver the articles gripped by the grippers of the downstream side rotary wheel to a rotary wheel disposed further downstream.

2. The article conveying device according to claim 1, wherein a gripper switched from the use state to the retreat state by said retreating means comprises a pair of grip members provided to be openable and closable to grip an article, when said gripper is switched to the use state by said retreating means, said two grip members are allowed to perform opening and closing operations so as to deliver the article from the gripper of the upstream side wheel to the gripper of the downstream side wheel, and when said gripper is switched to the retreat state, said grip members are kept in an opened state so that tip ends of the grip members do not interfere with the article held by the gripper of the other rotary wheel.

3. The article conveying device according to claim 2, further comprising rotational position detecting means detecting a rotational position of each of the grippers switched from the use state to the retreat state by said retreating means, wherein when said control means switches said grippers to the retreat state, said control means operates said retreating means to keep the grip members in the opened state forcefully for at least the grippers located in said delivery position detected by said rotational position detecting means.

4. An article conveying device in which a plurality of rotary wheels each provided with a plurality of grippers gripping articles equidistantly in a circumferential direction are disposed and in a delivery position in which these rotary wheels are adjacent to each another, articles are delivered from grippers of an upstream side rotary wheel to grippers of a downstream side rotary wheel, comprising:

retreating means switching the grippers provided at the upstream side rotary wheel between a use state in which the grippers deliver articles to the downstream side rotary wheel and a retreat state in which the grippers do not interfere with the articles held by the downstream side rotary wheel; and control means controlling the retreating means, wherein when said upstream side rotary wheel abnormally stops, said control means controls said retreating means to switch at least the grippers of the upstream side rotary wheel, which are located in said delivery position, from the use state to the retreat state to prevent the grippers of the upstream side rotary wheel and the articles gripped by the grippers of the downstream side rotary wheel from interfering with one another, and rotation of the downstream side rotary wheel is continued to deliver the articles gripped by the grippers of the downstream side rotary wheel to a rotary wheel disposed further downstream.

5. An article conveying device in which a plurality of rotary wheels each provided with a plurality of grippers gripping articles equidistantly in a circumferential direction are disposed and in a delivery position in which these rotary wheels are adjacent to each other, articles are delivered from grippers of an upstream side rotary wheel to grippers of a downstream side rotary wheel, comprising:

retreating means switching the grippers provided at the downstream side rotary wheel between a use state in which the grippers receive articles from the upstream side rotary wheel and a retreat state in which the grippers do not interfere with the articles held by the upstream side rotary wheel; and control means controlling the retreating means;

wherein when said downstream side rotary wheel abnormally stops, said control means controls said retreating means to switch at least the grippers of the downstream side rotary wheel, which are located in said delivery position, from the use state to the retreat state to prevent the grippers of the downstream side rotary wheel and the articles gripped by the grippers of the upstream side rotary wheel from interfering with one another, and rotation of the upstream side rotary wheel is continued, and the articles gripped by the grippers of the upstream side rotary wheel are collected by collecting means provided to collect the articles.

6. An article conveying device in which a plurality of rotary wheels each provided with a plurality of grippers gripping articles equidistantly in a circumferential direction are disposed and in a delivery position in which these rotary wheels are adjacent to each another, articles are delivered from grippers of an upstream side rotary wheel to grippers of a downstream side rotary wheel, comprising:

retreating means switching the grippers provided at the upstream side rotary wheel between a use state in which the grippers deliver articles to the downstream side rotary wheel and a retreat state in which the grippers do not interfere with the articles held by the downstream side rotary wheels; and control means controlling the retreating means, wherein when said downstream side rotary wheel abnormally stops, said control means controls said retreating means to switch at least the grippers of the upstream side rotary wheel which are located in said delivery position from the use state to the retreat state to prevent the grippers of the upstream side rotary wheel and the articles gripped by the grippers of the downstream side rotary wheel from interfering with one another, and rotation of the upstream side rotary wheel is continued, and the articles gripped by the grippers of the upstream side rotary wheel are collected by collecting means provided to collect the articles.

* * * * *